United States Patent
Dzieciol et al.

(10) Patent No.: US 6,833,793 B2
(45) Date of Patent: Dec. 21, 2004

(54) METHOD OF A CONTINUOUS DETERMINATION OF AN INSTANTANEOUS POSITION OF AN IMPELLER BLADE TIP IN A ROTOR TURBINE MACHINE

(75) Inventors: Edward Dzieciol, Warsaw (PL); Ryszard Szczepanik, Warsaw (PL); Andrzej Szczepankowski, Warsaw (PL); Hieronim Karbowiak, Warsaw (PL)

(73) Assignee: Instytut Techniczny Wojsk Lotniczych, Warsaw (PL)

( * ) Notice: Subject to any disclaimer, the term of this patent is extended or adjusted under 35 U.S.C. 154(b) by 110 days.

(21) Appl. No.: 10/143,132

(22) Filed: May 10, 2002

(65) Prior Publication Data

US 2002/0167311 A1 Nov. 14, 2002

(51) Int. Cl.⁷ ............................................. G08B 21/00
(52) U.S. Cl. ................................ 340/686.3; 340/545.3; 340/686.1; 340/686.6; 60/39.34; 415/14; 415/70
(58) Field of Search ...................... 340/686.3, 686.2, 340/686.6, 444, 545.3, 870.17, 686.1; 73/660, 116; 702/33, 56; 324/642, 644; 415/14, 72, 70; 60/39.01, 39.34, 39.35, 39.43

(56) References Cited

U.S. PATENT DOCUMENTS

| | | | | |
|---|---|---|---|---|
| 4,876,505 A | * | 10/1989 | Osborne | ................ 324/207.25 |
| 5,043,703 A | | 8/1991 | Dipoala et al. | ............. 340/554 |
| 5,206,816 A | * | 4/1993 | Hill et al. | ..................... 73/660 |
| 5,555,457 A | * | 9/1996 | Campbell et al. | ...... 340/870.17 |
| 5,818,242 A | * | 10/1998 | Grzybowski et al. | ....... 324/642 |
| 6,094,989 A | * | 8/2000 | Twerdochlib | ................ 73/659 |
| 6,448,924 B1 | * | 9/2002 | Hafer, Jr. | ..................... 342/28 |

* cited by examiner

Primary Examiner—Davetta W. Goins
(74) Attorney, Agent, or Firm—Zbigniew P. Sawicki; Westman, Champlin & Kelly, P.A.

(57) ABSTRACT

The invention relates to a method of a continuous determination of an instantaneous position of an impeller blade tip (5') in a rotor turbine machine, particularly in a turbine impeller (6) in a turbojet engine during its operation in a real condition in order to obtain a current information on a technical state of the blade (5). In a selected place of an housing (7) of a rotor turbo machine, in a movement plane of impeller blade tips (5'), it is arranged in a stable manner at least one microwave antenna (3) with an aperture shape (4) which is consistent with an internal surface of an housing (7). The microwave signal (11), which is produced by a microwave homodyne system, is emitted, and then received, through a microwave antenna (3). The output signal (9) from that system, which carries out information on each instantaneous position of an impeller blade tip (5') in relation to an antenna aperture (4), is converted by an electronic system, and then it is read.

2 Claims, 1 Drawing Sheet

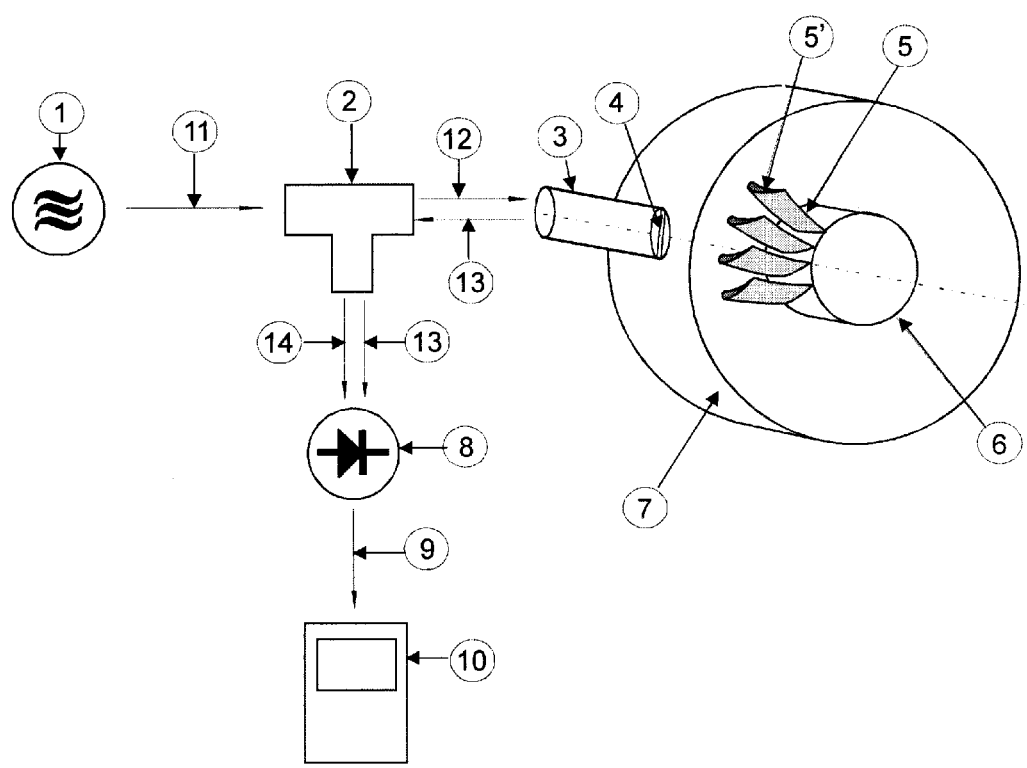

METHOD OF A CONTINUOUS DETERMINATION OF AN INSTANTANEOUS POSITION OF AN IMPELLER BLADE TIP IN A ROTOR TURBINE MACHINE

The invention relates to a method of a continuous determination of an instantaneous position of an impeller blade tip in a rotor turbine machine, particularly in a turbine impeller in a turbojet engine during its operation in a real condition in order to obtain a current information on a technical state of a blade.

During manufacturing, operation and repairing of a turbojet engine, before a destruction of turbojet rotor blades during their operation, an inspection and detection of blade states is needed for finding signals of an engine failure. It is particularly important in a real operational state and in a connection with a risk associated with it, e.g. during a flight.

U.S. Pat. No. 5,043,703 describes a method for monitoring of a microwave homodyne system for detection of any movement. The invention relates to making use of microwave homodyne system for an observation of a movement of an object in an observation field under microwave radiation.

In the known invention, the determination of a position of an object in static states is impossible because the observation is associated only with the change of a radio-wave frequency which is produced by a movement of objects in an observation field and which is not useful during a turbojet engine operation when the temperature is above 150° C.

The object of the present invention is to arrange in a stable manner, in a selected place of housing of a rotor turbo machine and in a movement plane of an impeller blade tips, at least one microwave antenna with an aperture shape which is consistent with an internal surface of an housing, while maintaining conditions for a working medium in a form of an undisturbed gas flow. A microwave signal, which is produced by a microwave homodyne system, is emitted, and then received, through a microwave antenna. An output signal from that system, which carries out information on each instantaneous position of an impeller blade tip in relation to the antenna aperture, is converted by an electronic system, preferably by an electronic computer, and is read to isolate information on instantaneous, in a real time, position of blades both in relation to each other and in a plane of their movement.

A method according to the present invention allows to obtain a signal, which previously was very difficult to obtain, carrying information on an instantaneous, in a real time, position of impeller blade tips in a rotational turbine machine and signals carrying information on another mechanical effects occurring during an operation of that machine.

A method according to the present invention is carried out as follow. A three-way switch 2 divides a carrier signal 11, which was produced in a microwave generator 1, on two signal channels: reference signal 14 and testing signal 12. The testing signal 12 is fed, through one of an arm of a three-way switch 2, to microwave antenna 3, which is permanently arranged in a housing 7 of a turbojet aviation engine in a plane of a movement of impeller blade tips 5' of a turbojet engine impeller 6. A signal is emitted through a microwave antenna 3, which acts as a sensor, and then is received, already as a signal which was suitably modulated as a result of an electromagnetic reflection from turbine impeller blade 5, proportionally to a present position of its tip 5' in relation to an antenna aperture 4. The received modulated signal 13, carrying information on instantaneous position of a blade tip 5' of a turbine impeller 6 in relation to an antenna aperture 4, is fed through the three way switch 2 to a detector 8, to which, through the same three-way switch 2, the reference signal 14 is also fed. It is a condition for a homodyne operation of the detector 8. A signal 9, which was detected in that manner, is fed to a computer 10, which identifies, isolates, analysis and reads an information on shifts of blade tips 5' of a turbine impeller 6 in their movement plane, values of changes of blade 5 untwist, values of longitudinal shifts of whole blade 5 annulus of a turbine impeller 6.

What is claimed is:

1. A method of a continuous determination of an instantaneous position of an impeller blade tip in a rotor turbine machine, wherein a microwave signal of homodyne system is used, characterized by stable arranging, in a selected place of a housing of a rotor turbo machine, in a movement plane of impeller blade tips, one microwave antenna with an aperture shape which is consistent with an internal surface of the housing and a microwave signal which is produced by a microwave homodyne system, is emitted, and then received, through a microwave antenna, and then an output signal from that system, which carries out information on each instantaneous position of an impeller blade tip in relation to an antenna aperture is converted by an electronic system.

2. A method according to claim 1, characterized by converting an output signal from the homodyne system by a computer.

* * * * *